(12) United States Patent
Wicks et al.

(10) Patent No.: US 9,810,176 B2
(45) Date of Patent: *Nov. 7, 2017

(54) UNITARY COMPOSITE CAM COVER AND CARRIER AND ASSEMBLY METHOD

(71) Applicant: Ford Global Technologies, LLC, Dearborn, MI (US)

(72) Inventors: Christopher Donald Wicks, Allen Park, MI (US); Mark Michael Madin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/576,599

(22) Filed: Dec. 19, 2014

(65) Prior Publication Data

US 2016/0177867 A1    Jun. 23, 2016

(51) Int. Cl.
| | |
|---|---|
| *F01M 9/10* | (2006.01) |
| *F02F 7/00* | (2006.01) |
| *F01M 13/00* | (2006.01) |
| *F01M 13/04* | (2006.01) |
| *F01L 1/053* | (2006.01) |
| *F01L 1/047* | (2006.01) |

(52) U.S. Cl.
CPC .............. *F02F 7/006* (2013.01); *F01L 1/053* (2013.01); *F01M 9/10* (2013.01); *F01M 9/102* (2013.01); *F01M 9/105* (2013.01); *F01M 13/0011* (2013.01); *F01M 13/0416* (2013.01); *B23P 2700/02* (2013.01); *F01L 2001/0471* (2013.01); *F01L 2001/0476* (2013.01); *F01L 2001/0537* (2013.01); *F01L 2101/00* (2013.01); *F01L 2103/00* (2013.01)

(58) Field of Classification Search
CPC ... F01L 1/047; F01L 1/053; F01L 2001/0476; F02F 7/006; F01M 9/102
USPC .................................. 123/90.16, 90.38, 90.6
See application file for complete search history.

(56) References Cited

U.S. PATENT DOCUMENTS

| | | | |
|---|---|---|---|
| 5,285,754 A | 2/1994 | Bell | |
| 5,323,740 A | 6/1994 | Daily et al. | |
| 5,375,569 A | 12/1994 | Santella | |
| 5,540,553 A * | 7/1996 | Goto | ................... B29C 45/0005 416/241 A |
| 6,269,799 B1 * | 8/2001 | Watanabe | ............. F02B 61/045 123/509 |
| 7,316,215 B1 | 1/2008 | Nino et al. | |

(Continued)

FOREIGN PATENT DOCUMENTS

| | | |
|---|---|---|
| CN | 201650491 U | 11/2010 |
| CN | 203097995 U | 7/2013 |

*Primary Examiner* — Ching Chang
(74) *Attorney, Agent, or Firm* — Greg P. Brown; Price Heneveld LLP

(57) ABSTRACT

A valve cover module includes a unitary cover and carrier made of a carbon fiber composite. The unitary cover and carrier has a lower side with a peripheral edge for attaching to a cylinder head. The lower side of the unitary cover and carrier also has a series of cavities interconnected with aligned apertures defining bearing surfaces. A plurality of cam lobes is disposed in the series of cavities. Also, the valve cover module includes a camshaft rotatable on the bearing surfaces and extending through the aligned apertures to couple with the cam lobes.

20 Claims, 8 Drawing Sheets

(56) References Cited

U.S. PATENT DOCUMENTS

| | | | |
|---|---|---|---|
| 7,665,435 B2 * | 2/2010 | Imazato | F01L 1/053 |
| | | | 123/193.5 |
| 8,065,933 B2 * | 11/2011 | Coderre | B62M 3/086 |
| | | | 36/131 |
| 8,397,688 B2 | 3/2013 | Cunningham | |
| 9,593,642 B2 * | 3/2017 | Wicks | F02F 7/006 |
| | | | 123/90.38 |
| 2004/0144349 A1 | 7/2004 | Wampula et al. | |
| 2011/0155084 A1 | 6/2011 | Sargeant | |
| 2012/0167845 A1 | 7/2012 | Sands et al. | |

\* cited by examiner

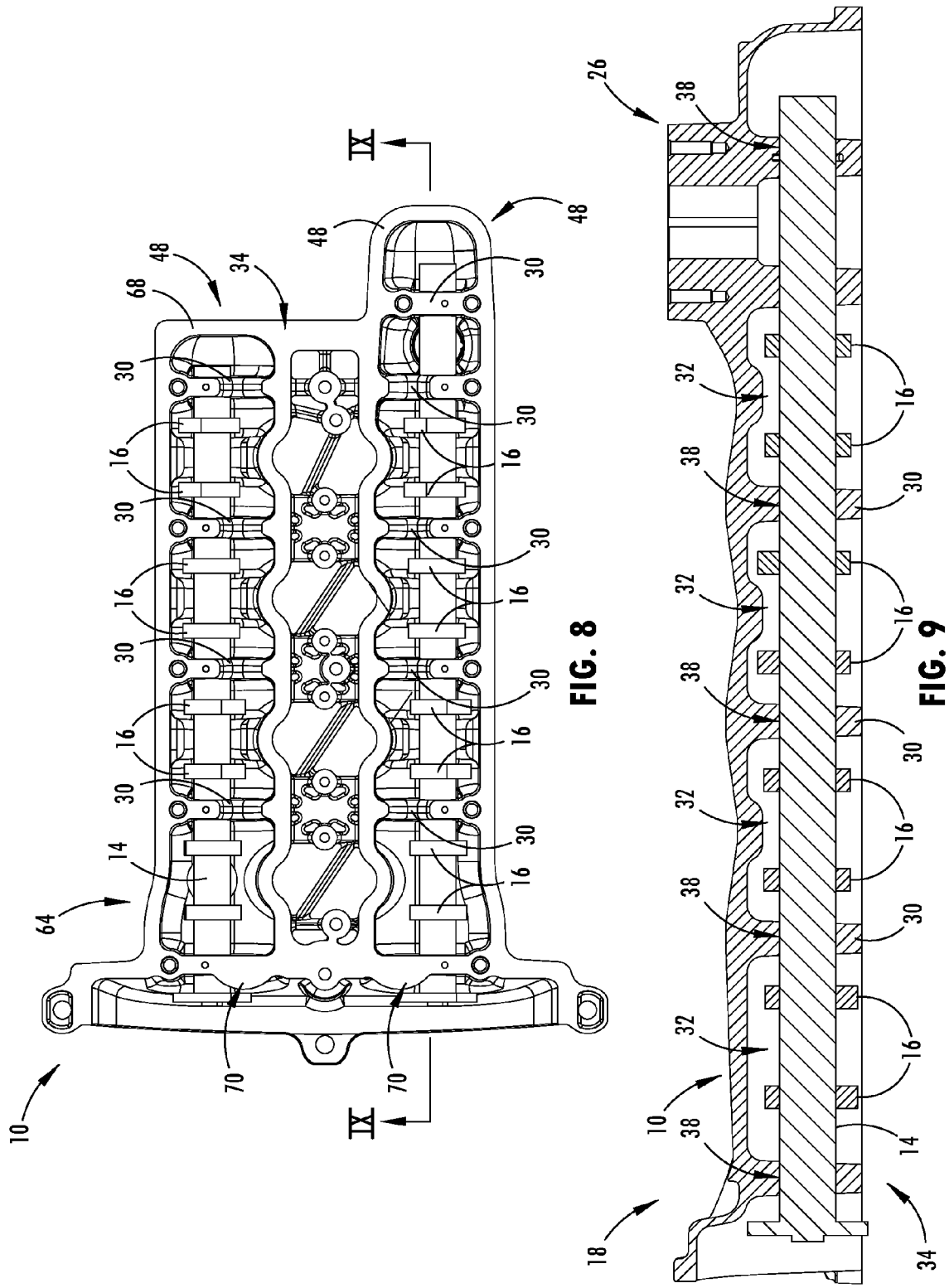

UNITARY COMPOSITE CAM COVER AND CARRIER AND ASSEMBLY METHOD

FIELD OF THE INVENTION

The present invention generally relates to a valve cover module that attaches to a cylinder head for enclosing engine valves, and more particularly relates to a unitary cover and carrier made of a carbon fiber composite and an associated method of assembling a valve cover module.

BACKGROUND OF THE INVENTION

It is generally understood that internal combustion engines typically have intake and exhaust valves that interface directly or indirectly with cam lobes of a camshaft to control timing of the valves opening and closing. The camshaft is commonly attached to and assembled on a cylinder head with a cam carrier that is bolted to the cylinder head around the valves. To enclose the camshaft after assembly and prevent oil leakage, a cam cover is usually attached over the cam carrier. It is generally appreciated that reduced vehicle weight is desired for increased fuel efficiency, among other reasons. Previous attempts to reduce engine weight have included forming the cam cover with polymeric materials and lightweight metals; however, the cam carrier and associated components for operation of the camshaft have material requirements that typically do not accommodate such lightweight cam cover materials. Further, it is desired for vehicle engines to be smaller and assembled with fewer steps and parts that at least maintain structural and operational performance of the engine.

SUMMARY OF THE INVENTION

According to one aspect of the present invention, a valve cover module includes a unitary cover and carrier made of a carbon fiber composite. The unitary cover and carrier has a lower side with a series of cavities interconnected with aligned apertures defining bearing surfaces and a peripheral edge for attaching to a cylinder head. A plurality of cam lobes is disposed in the series of cavities. Also, the valve cover module includes a camshaft rotatable on the bearing surfaces and extending through the aligned apertures to couple with the cam lobes.

According to another aspect of the present invention, a unitary cover and carrier for enclosing engine valves includes a cover portion and a carrier portion. The cover portion has an exterior surface with an integrally formed fuel pump pedestal and an oil fill port. The carrier portion includes a series of vertical walls having aligned apertures that define cam bearings. The cover and carrier portions are integrally formed together with carbon fiber composite as a single unit.

According to another aspect of the present invention, a method of assembly includes providing an integral cam cover and carrier made of a carbon fiber composite. The integral cam cover and carrier have a lower side with a series of cavities interconnected with aligned apertures defining bearing surfaces. The method also includes the step of aligning cam lobes within the series of cavities. Further, the method includes inserting a camshaft through the aligned apertures to couple with each of the cam lobes and thereby defining a valve cover module for attaching to a cylinder head.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8 is a bottom plan view of the unitary cover and carrier with camshafts and cam lobes assembled therewith;

FIG. 9 is a cross-sectional view of the unitary cover and carrier, camshaft, and cam lobes, taken at line IX-IX of FIG. 8;

DETAILED DESCRIPTION OF THE PREFERRED EMBODIMENTS

Figure 1:
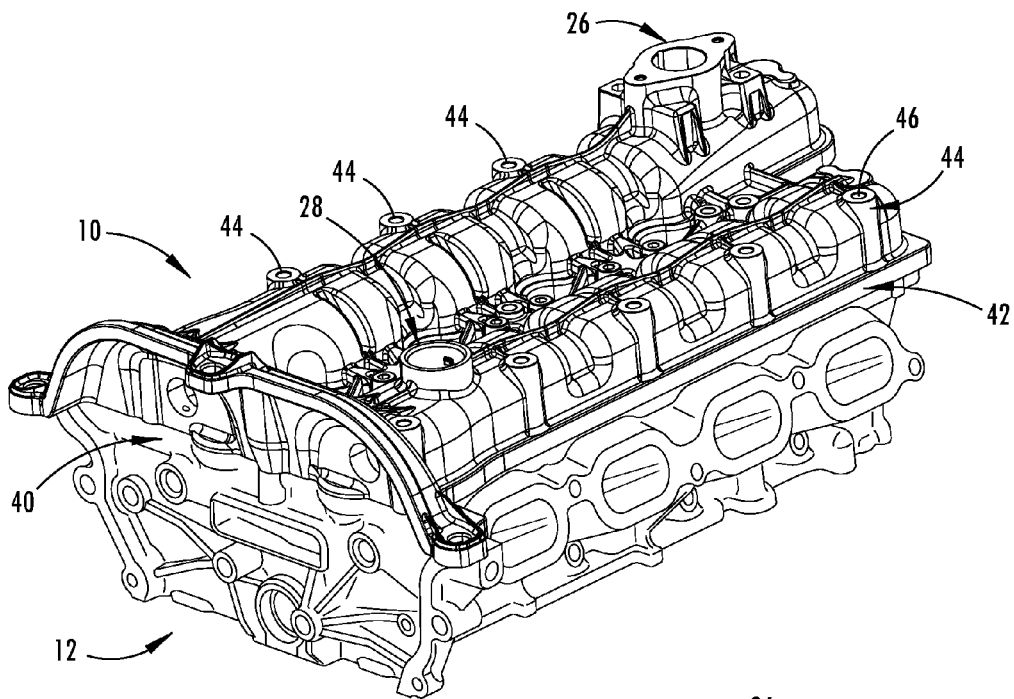
FIG. 1 is a top perspective view of a unitary cover and carrier attached to a cylinder head, according to one embodiment of the present invention.

For purposes of description herein, the terms "upper," "lower," "right," "left," "rear," "front," "vertical," "horizontal," and derivatives thereof shall relate to the embodiment of the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-13, reference numeral 10 generally designates a unitary cover and carrier for attaching to a cylinder head 12 and enclosing engine valves thereon. According to one embodiment of the present invention, prior to mounting on the cylinder head 12, the unitary cover and carrier 10 may be assembled with a camshaft 14 and a plurality of cam lobes 16 to define a valve cover module 18, which reduces complexity and assembly steps at the stage of engine construction, among other advantages. The unitary cover and carrier 10 may include a cover portion 20 and a carrier portion 22 that are integrally formed together with a carbon fiber composite as a single unit, eliminating the need for an intermediate gasket that is typically used between separate cam covers and cam carriers, thereby avoiding the associated problems. The cover portion 20 may have an exterior surface 24 with an integrally formed fuel pump pedestal 26 and an oil fill port 28. The carrier portion 22 may include a series of vertical walls 30 that separate and define a series of cavities 32 on an interior surface 34 of the unitary cover and carrier 10. The series of vertical walls 30 may have aligned apertures 36 that interconnect the series of cavities 32 and define cam bearings 38. Accordingly, the plurality of cam lobes 16 may be disposed and positioned within the series of cavities 32 and the camshaft 14 may extend through the aligned apertures 36 to couple with the cam lobes 16. The camshaft 14 may thereby rotate on the cam bearings 38 defined by the aligned apertures 36 to operate the engine valves in according with the overall engine requirements for a vehicle. It is however, contemplated that the unitary cover and carrier 10 may also be applied to engines not used in conjunction with a vehicle.

Referring now to the embodiment illustrated in FIG. 1, the unitary cover and carrier 10 is attached to an upper portion 40 of the cylinder head 12 for enclosing the engine valves and positioning the camshaft 14 and associated cam lobes 16 (FIG. 7) in alignment to interface directly or indirectly with the engine valves. It is contemplated that the upper portion 40 of the cylinder head 12 may include rocker arms, intake and exhaust valves, valve springs, and other conceivable components that may be concealed by the unitary cover and carrier 10. Although referenced herein as the upper portion 40 of the cylinder head 12, it is understood that additional embodiments of the cylinder head 12 may be alternatively oriented or rotated, such as in a boxer-style engine, to position the valves on a lower or side portion of the cylinder head 12.

As also shown in the embodiment depicted in FIG. 1, a lower peripheral edge 42 of the carrier portion 22 of the unitary cover and carrier 10 is generally fixedly attached around the upper portion 40 of the cylinder head 12 to form a liquid seal for preventing fluid from leaking therebetween. In one embodiment, the liquid seal may be formed by a gasket attached around the peripheral edge 42 and compressed between the cylinder head 12 and the unitary cover and carrier 10. The illustrated embodiment of the unitary cover and carrier 10 also includes head mounting bosses 44 integrally protruding upward from the exterior surface 24 of the cover portion 20 proximate the peripheral edge 42 to allow fasteners to extend through mounting holes 46 formed centrally through the head mounting bosses 44 and into engagement with the cylinder head 12, thereby securing the unitary cover and carrier 10 to the cylinder head 12. The head mounting bosses are cylindrically shaped in the illustrated embodiment with sufficient mass to allow the fasteners to compress the head mounting bosses 44 and form the fluid seal between the unitary cover and carrier 10 and the cylinder head 12. Although, it is appreciated that the head mounting bosses 44 and the associated mounting holes 46 may be alternatively shaped and arranged on the unitary cover and carrier 10 in additional embodiments. It is also contemplated that the fasteners may include bolts or other conceivable attachment features that will withstand operating conditions of the engine.

Figure 2:
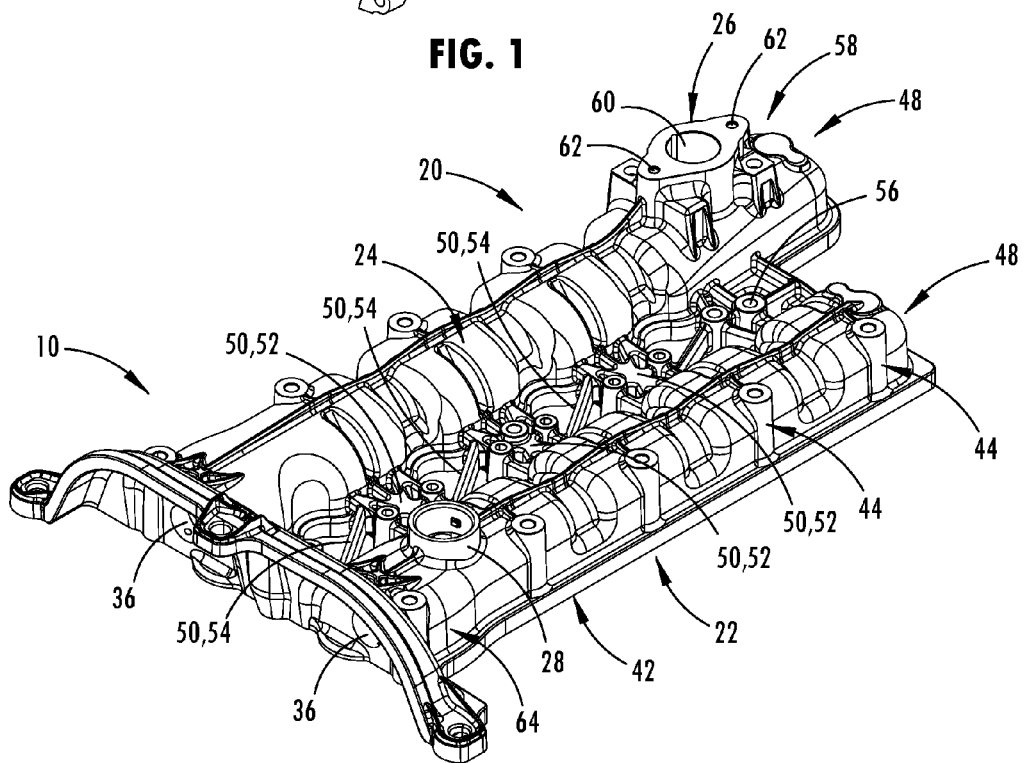
FIG. 2 is a top perspective view of the unitary cover and carrier shown in FIG. 1.
Figure 3:
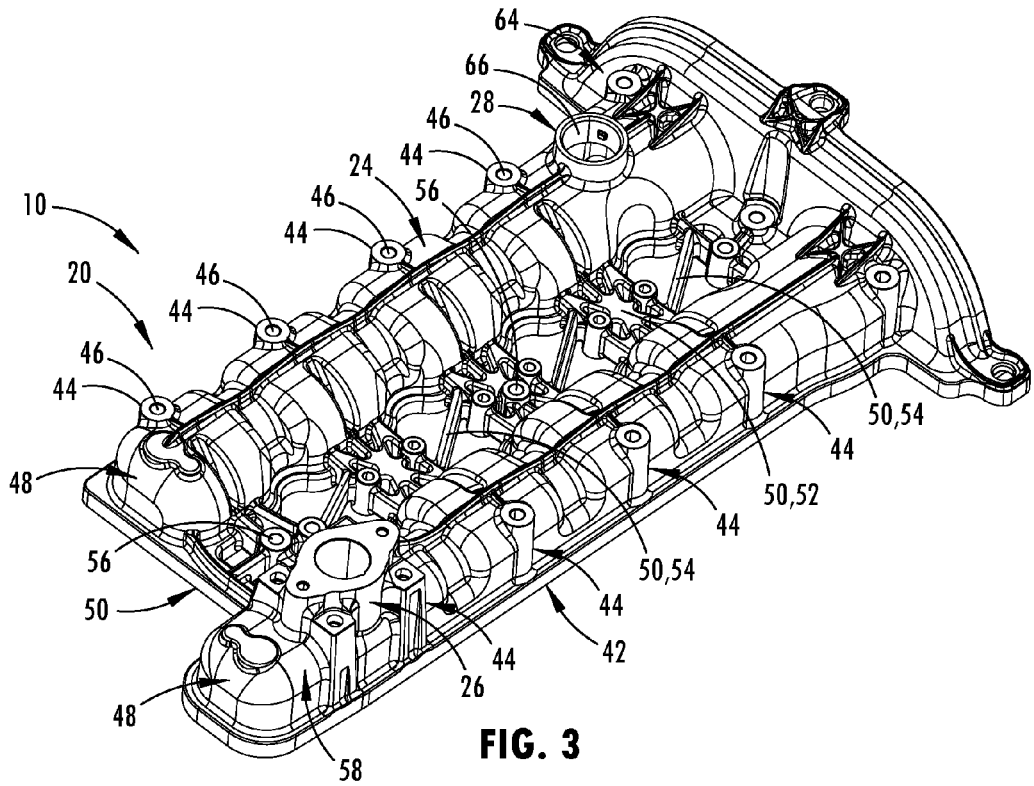
FIG. 3 is a top perspective view of the unitary cover and carrier taken from an end opposite from that depicted in FIG. 2.

As illustrated in FIGS. 2-3, the unitary cover and carrier 10 is detached from the cylinder head 12. The illustrated embodiment of the unitary cover and carrier 10 includes two longitudinal cam housings 48 extending in parallel relationship to each other and in alignment with a rotational axis of the associated camshaft. The longitudinal cam housings 48 are interconnected with reinforcement members 50 that are formed integrally with the overall unitary cover and carrier 10. The reinforcement members 50, in the illustrated embodiment, include attachment members 52 that extend orthogonally between the longitudinal cam housings 48 and linking members 54 that extend diagonally across the spacing between the longitudinal cam housings 48 to interconnect the attachment members 52. As shown, the attachment members 52 each include two head mounting bosses 44 with corresponding mounting holes 46 to similarly receive fasteners for attaching the unitary cover and carrier 10 to the cylinder head 12 (FIG. 1). Some of the illustrated reinforcement members 50 also secure and interconnect integrally formed rail mounting bosses 56 between the longitudinal cam housings 48 for attaching at least one fuel rail that extends in general parallel alignment with the camshafts, as generally understood in the art. The rail mounting bosses 56 are also cylindrically shaped in the illustrated embodiment, but may be alternatively shaped or arranged in additional embodiments of the unitary cover and carrier 10. It is also contemplated that additional embodiments may include a single camshaft or camshafts spaced apart far enough to necessitate separate valve cover modules that have a single longitudinal cam housing, and therefore no interconnecting attachment member 52. Further, it is conceivable that alternative embodiments may have more or alternatively arranged camshafts to require additional longitudinal cam housings 48 or a differently configured unitary cover and carrier 10.

To further reduce the number of assembly components and potentially unstable connections, other features may also be integrally formed into the unitary cover and carrier 10. In the illustrated embodiment shown in FIGS. 2-3, a first end 58 of one of the longitudinal cam housings 48 has an integrally formed fuel pump pedestal 26 protruding upward therefrom. The fuel pump pedestal 26 is defined by a generally planar upper surface spanning over the vertically protruding fuel pump pedestal 26 with a hole 60 extending downward in a central area and two smaller attachment apertures 62 on opposing sides of the hole 60. The attachment apertures 62 are configured to receive fasteners for securing a fuel pump to the planar upper surface of the fuel pump pedestal 26, which defines the exterior surface 24 of the cover portion 20 of the unitary cover and carrier 10. Additional embodiments may have the fuel pump pedestal 26 alternatively configured or positioned on the exterior surface 24 of the unitary cover and carrier 10. A second end 64 of the other longitudinal cam housing 48 has an integrally formed oil fill port 28 that extends through the cover portion 20 to interconnect with one of the series of domed cavities 32. The oil fill port 28 in the illustrated embodiment is defined by a tubular protrusion that extends upward and has a pair of cap securing features 66 on an inner surface thereof to engage a corresponding oil cap that sealably covers the oil fill port 28 to prevent oil from leaking therefrom. It is understood that the fuel pump pedestal 26 and the oil fill port 28 may be alternatively configured and form at another end or other conceivable location on either of the longitudinal cam housings 48.

Figure 4:
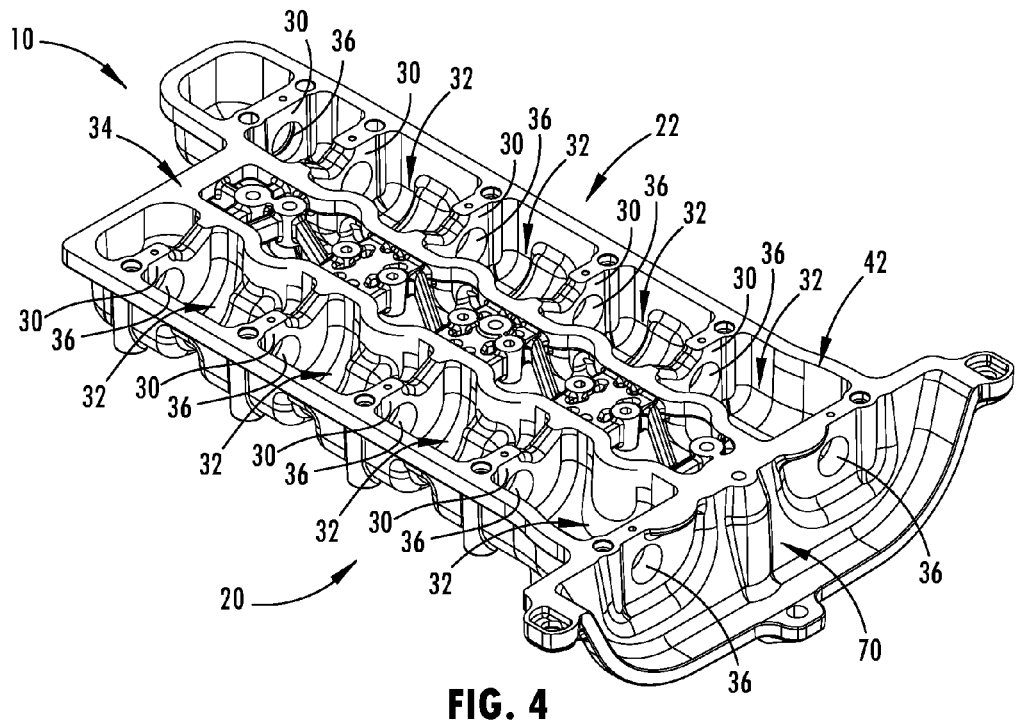
FIG. 4 is a bottom perspective view of the unitary cover and carrier.
Figure 5:
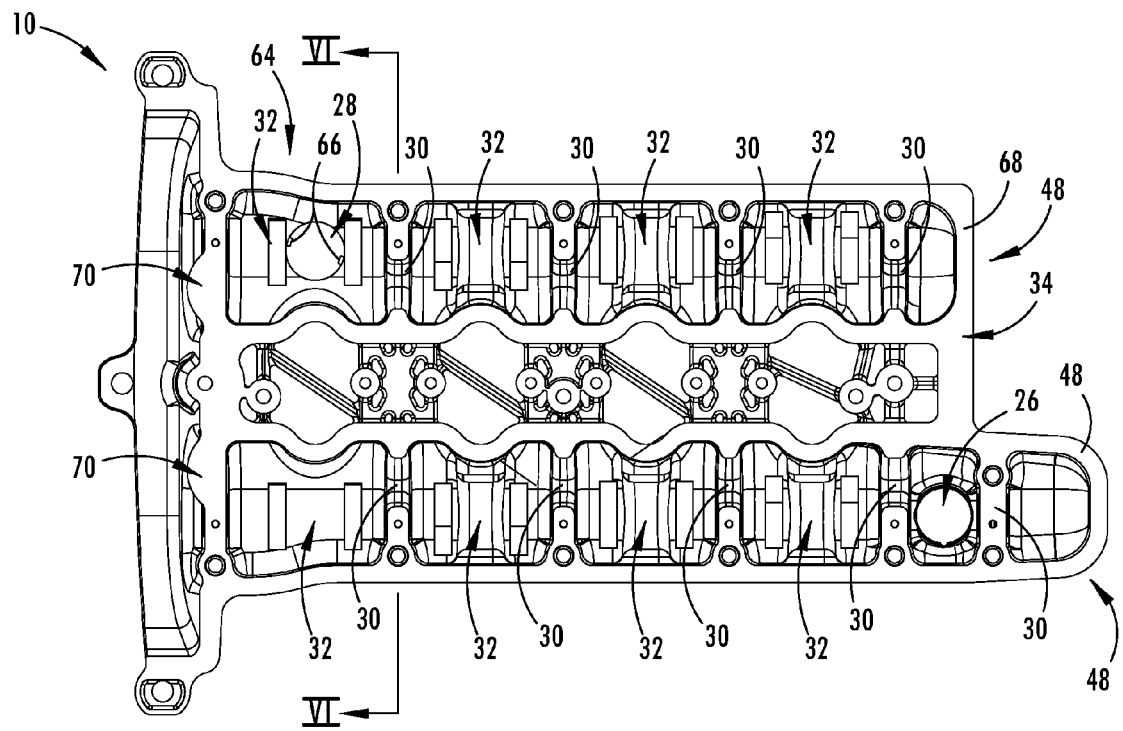
FIG. 5 is a bottom plan view of the unitary cover and carrier.

With reference to FIGS. 4-5, the interior surface 34 of the illustrated embodiment of the unitary cover and carrier 10 is shown having two rows of the series of vertical walls 30, one row along each of the longitudinal cam housings 48. The vertical walls 30 are oriented generally orthogonal to the rotational axis of the camshafts 14 (FIG. 7) and are spaced apart to separate and define the series of cavities 32, each having a generally domed shape. The series of cavities 32 are sufficiently sized to include cavities that surround the cam lobes 16 of the camshaft 14 and permit rotation therein. Each wall of the series of vertical walls 30 has one of the aligned apertures 36 that interconnect the series of cavities 32 and define the cam bearings 38. A first end wall 68 of the unitary cover and carrier 10, proximate the first end 58 of each of the longitudinal cam housings 48, does not include an aperture to enclose the corresponding ends of the camshafts 14. However, a second end wall 70 of the unitary cover and carrier 10, proximate the second end 64 of each of the longitudinal cam housings 48, includes one of the aligned apertures 36 for each of the camshafts 14 (FIG. 8) to protrude through the second end wall 70 out of the unitary cover and carrier 10 for engaging a timing mechanism, such as a belt or chain, as generally understood by one of ordinary skill.

Figure 6:
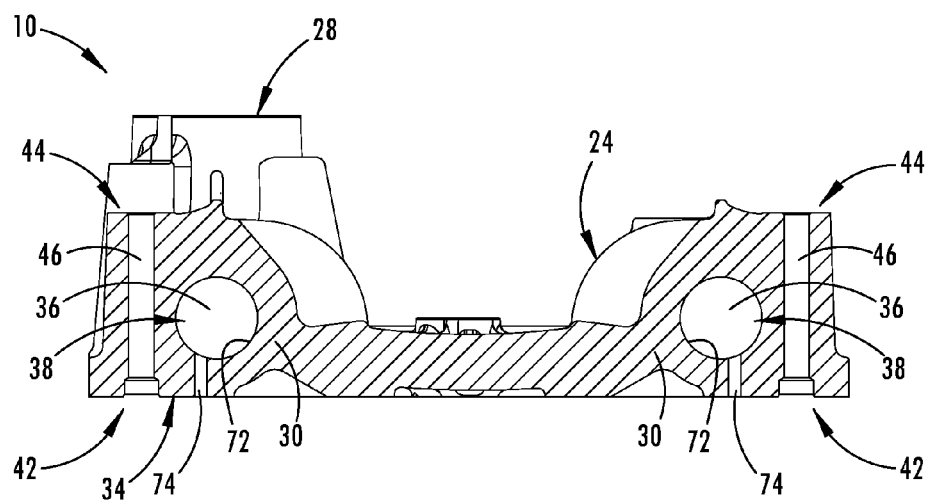
FIG. 6 is a cross-sectional view of the unitary cover and carrier, taken at line VI-VI of FIG. 5 and illustrating a cam bearing.

As further illustrated in FIG. 6, the cam bearings 38 are defined by a circumferential surface 72 of the aligned apertures 36 through the series of vertical walls 30, which are integrally formed with the single unit of carbon fiber composite that constitutes the unitary cover and carrier 10. In the illustrated embodiment, oil feed channels 74 are formed integrally within the series of vertical walls 30 and extend to the circumferential surface 72 of the aligned apertures 36 for lubricating the cam bearings 38. In the illustrated embodiment, the oil feed channels 74 extend to the camshaft interfacing surface of cam bearings 38 from the interior surface 34 of the unitary cover and carrier 10, inside the head mounting bosses 44 on the peripheral edge 42. The oil feed channels 74, as shown, enter a bottom portion of the cam bearings 38 at a location to form a sufficient thickness of lubricant to prevent the camshaft 14 from contacting the carbon fiber composite along the circumferential surface 72. Also, in this embodiment, the oil feed channels 74 align with and connect to corresponding channels in the cylinder head 12 (FIG. 1) to receive the flow of lubricating oil. However, it is contemplated that in additional embodiments, the oil feed channels may extend from alternative surfaces or locations on the unitary cover and carrier and the oil feed channels may enter the cam bearings at different locations.

Figure 7:
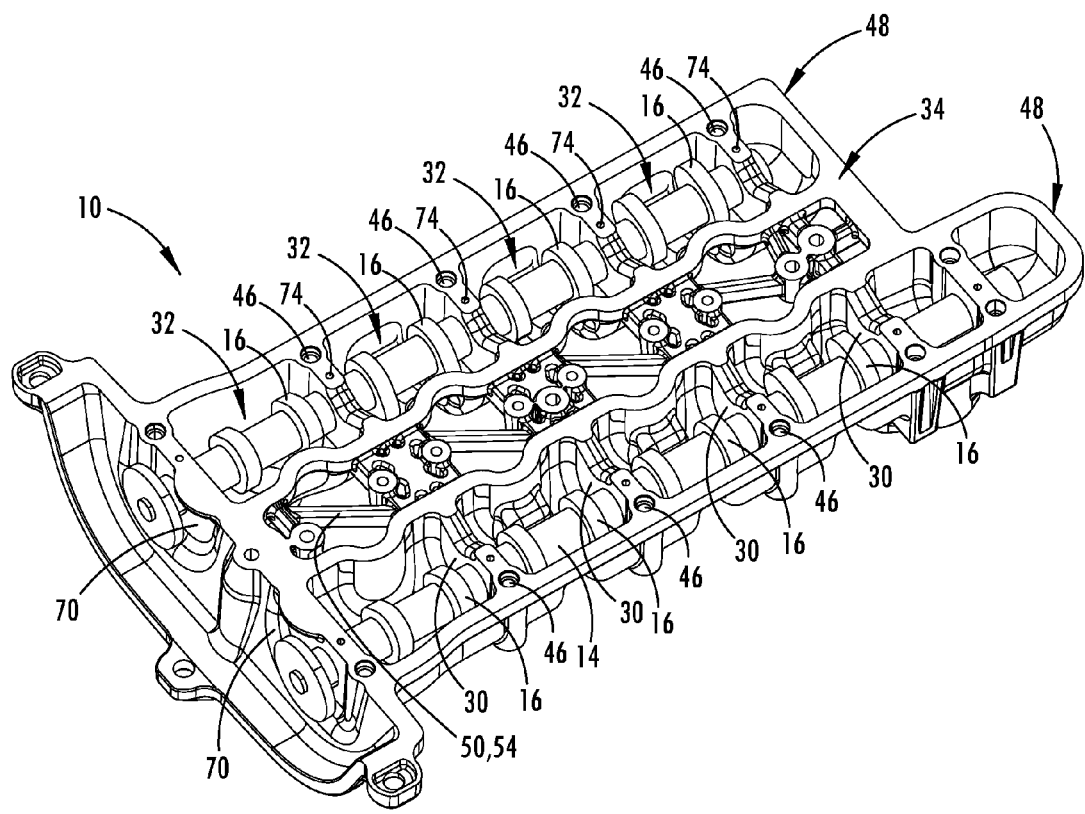
FIG. 7 is a bottom perspective view of the unitary cover and carrier, having a pair of camshafts and associated cam lobes assembled with the unitary cover and carrier.

Referring to the embodiment illustrated in FIGS. 7-9, the camshafts 14 and the cam lobes 16 are assembled with the unitary cover and carrier 10 to form the valve cover module 18. In this embodiment, the series of cavities 32 each house two cam lobes 16, for interfacing with the respective intake and exhaust valves on the cylinder head 12. Accordingly, the camshafts 14 each include eight cam lobes 16 separated into a row of four cavities of the series of cavities 32. The camshafts 14 rotatably couple with the aligned apertures 36 the allow rotation of the camshafts on the circumferential surfaces 72 of the cam bearings 38. As shown, the ends of the camshafts 14 proximate the second ends 64 of the longitudinal cam housings 48 extend through the second end wall 70 to allow operable engagement with a timing mechanism, such as a belt or chain. It is contemplated that in additional embodiments, the camshafts 14 may extend through both or alternating ends of the unitary cover and carrier 10 and more or fewer cam lobes 16 or alternative arrangements thereof may be contained within the series of cavities 32. It is also understood that additional embodiments may have more or fewer cavities on the interior surface 34, associated cam lobes 16, and camshafts 14 to accommodate different vehicle engines with different piston arrangements and cylinder heads.

With respect to the carbon fiber composite material used to integrally form the unitary cover and carrier 10 as a single unit, it is contemplated that various methods of carbon fiber construction may be used, including injection molding plastic resin with chopped carbon fiber particles. It is also conceivable that portions or the entire unitary cover and carrier 10 may be made with different carbon fiber constructions, such as wound filament or layered sheets. The carbon fiber composite may also include additional reinforcing fibers, such as aramid or glass fibers, and may have various compositions of resin or graphite materials to form the composite structure. Despite the construction, the illustrated embodiment of the unitary cover and carrier 10 has both interior and exterior surfaces 34, 24 defined by carbon fiber composite material. Further, the illustrated embodiment of the unitary cover and carrier 10 has the circumferential surfaces 72 of the aligned apertures 36 defined by carbon fiber composite material. It is contemplated that the circumferential surfaces 72 of the aligned apertures 36 may have strands of carbon fiber wound around the aligned apertures 36 to provide the circumferential surfaces 72 with fewer surface irregularities. Furthermore, it is contemplated that the circumferential surfaces 72 of the aligned apertures 36 may have coatings over the carbon fiber composite to also provide the circumferential surfaces 72 with fewer surface irregularities.

Figure 10:
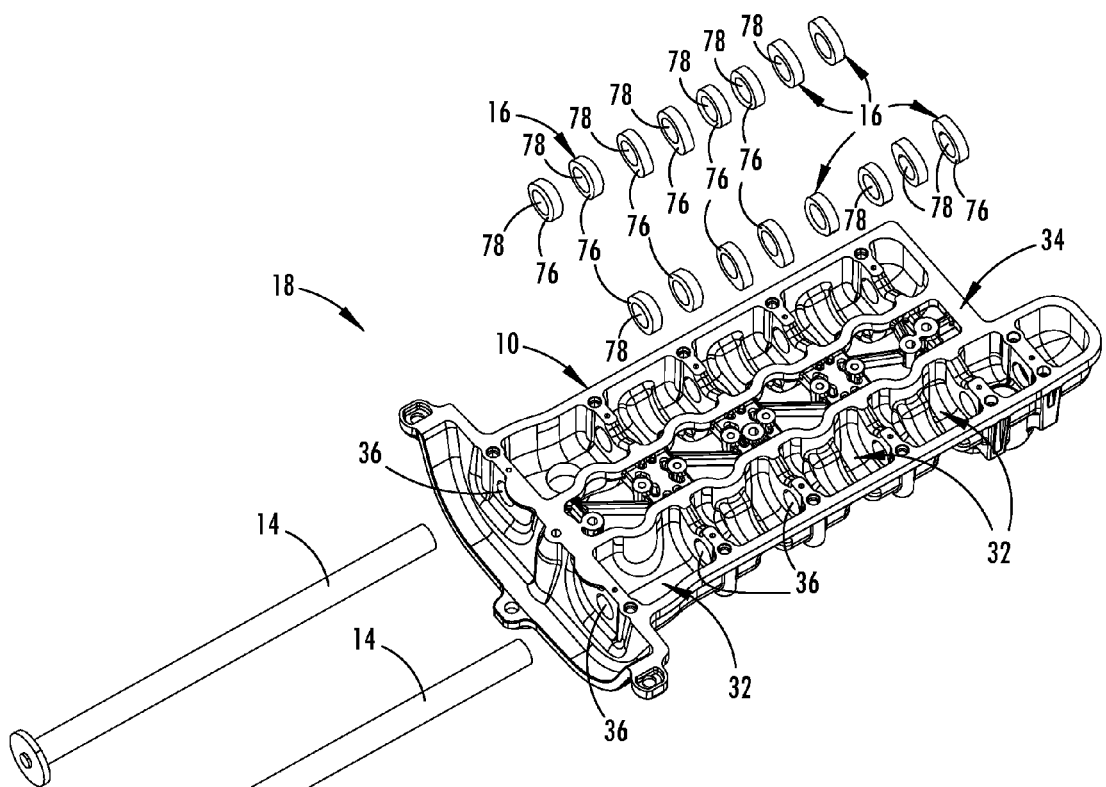
FIG. 10 is an exploded bottom perspective view of the unitary cover and carrier, having the pair of camshafts and associated cam lobes removed from the unitary cover and carrier.
Figure 11:
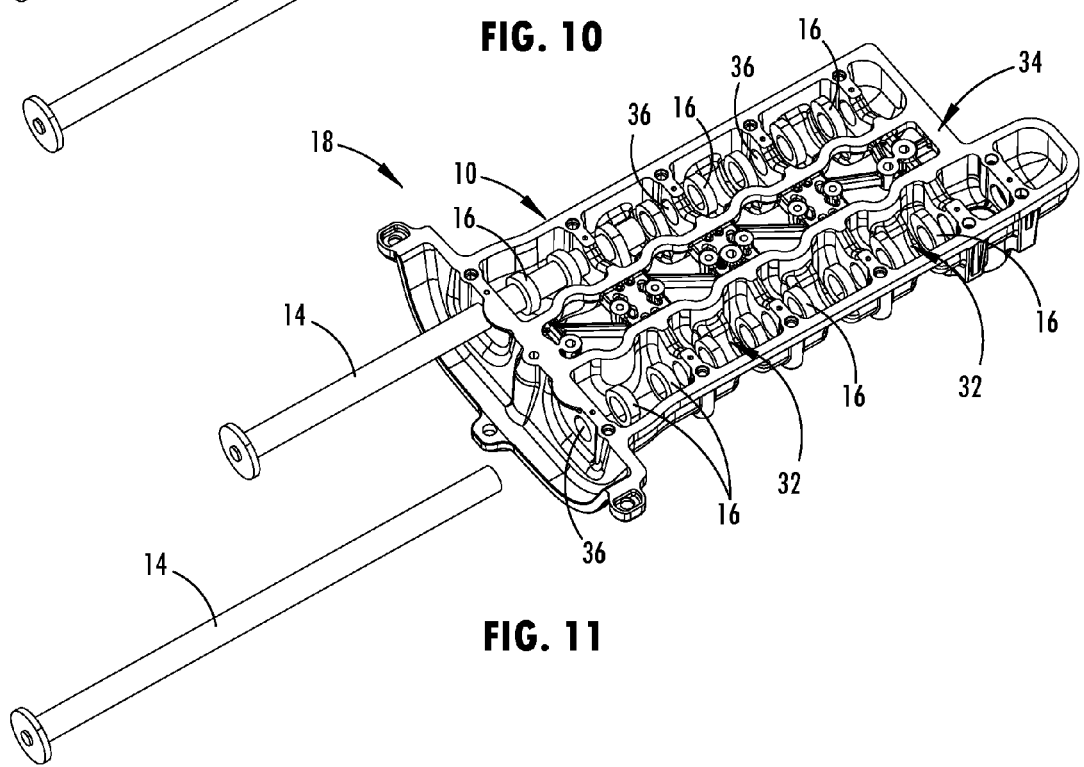
FIG. 11 is a bottom perspective view of the unitary cover and carrier, having the pair of camshafts and associated cam lobes partially assembled with the unitary cover and carrier.

With respect to the method of assembling the valve cover module 18, FIGS. 10 and 11 illustrate both a disassembled valve cover module 18 and the various steps of assembly, respectively. As shown, the cam lobes 16 are aligned with the series of cavities 32 on the interior surface 34 of the unitary cover and carrier 10 to position two cam lobes 16 in four cavities in each row of cavities along the longitudinal cam housings 48. The cam lobes 16 are each positioned vertically within the cavities, such as with a support frame, so a mating surface 76 of each cam lobe 16, defined by an interior surface of lobe apertures 78 formed therein, are aligned with the circumferential surfaces 72 of the aligned apertures 36. When the lobe apertures 78 are aligned with the aligned apertures 36 and the cam lobes 16 are radially positioned for appropriate valve timing, the camshafts 14 are inserted sequentially through the aligned apertures to couple with each of the cam lobes. The mating surfaces 76 of the lobe apertures 78 may be attached to the camshaft 14 with various techniques, including thermal expansion, welding, and other conceivable techniques generally understood by one having ordinary skill in the art. The cam lobes 16 in the illustrated embodiment have a greater diameter than the aligned apertures 36, such that the cam lobes 16 cannot be attached to the camshaft 14 prior to inserting the camshaft 14 through the aligned apertures 36 and into rotatable engagement with the cam bearings 38.

Upon inserting the camshafts 14 to a position with on the end portions exposed and all the cam lobes 16 attached thereto, the valve cover module 18 may be mounted to the cylinder head 12. To do so, the peripheral edge 42 of the unitary cover and carrier 10 may be attached to the cylinder head 12 around the engine valves thereon with a gasket that is disposed between the unitary cover and carrier 10 and the cylinder head 12 to provide a fluid seal. Prior to or after attaching the unitary cover and carrier 10 to the cylinder head 12, a fuel pump may be attached to the fuel pump pedestal 26 in direct contact with the carbon fiber composite.

Figure 12:
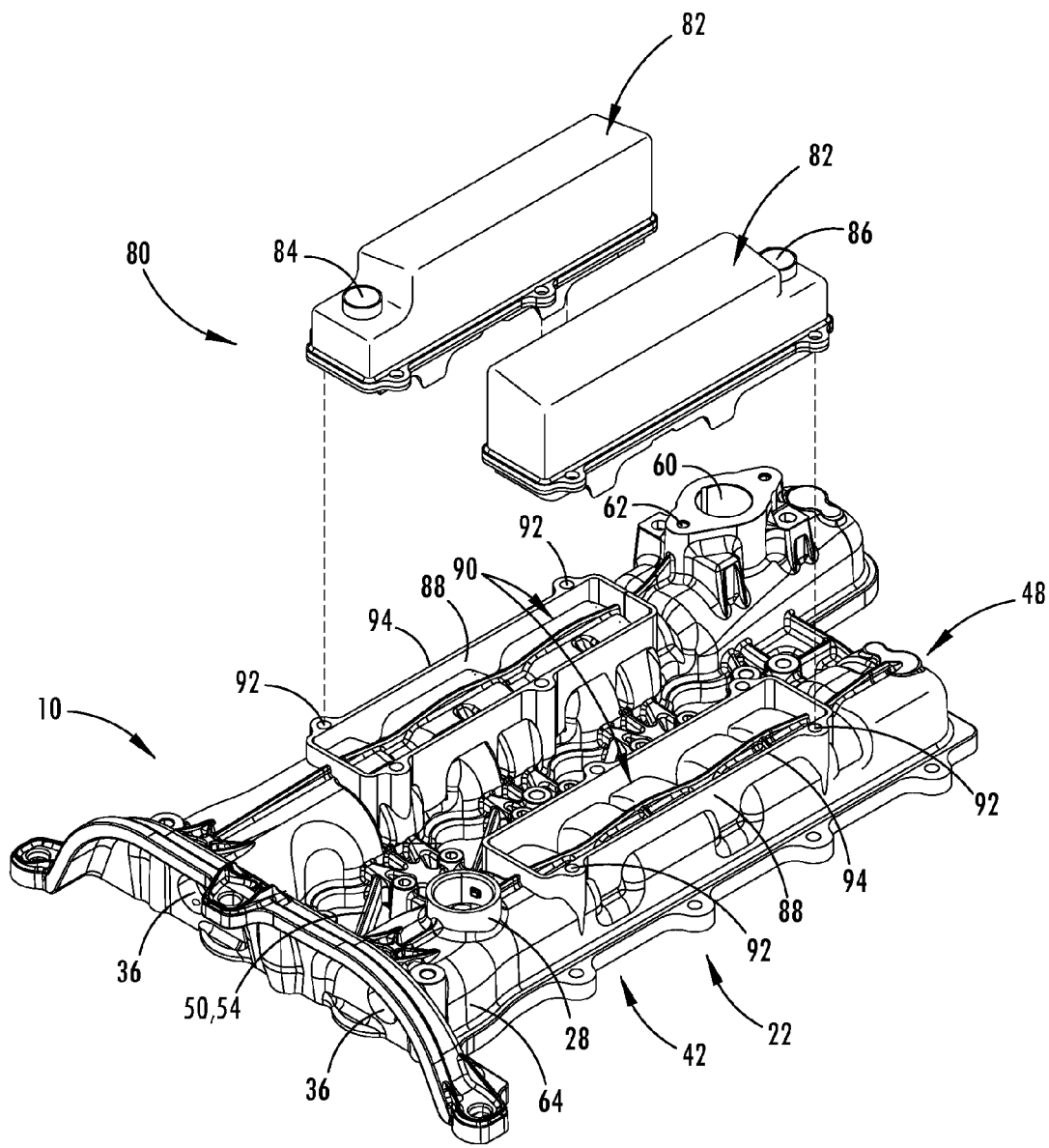
FIG. 12 is an exploded top perspective view of an additional embodiment of a unitary cover and carrier having an integrated PCV system.
Figure 13:
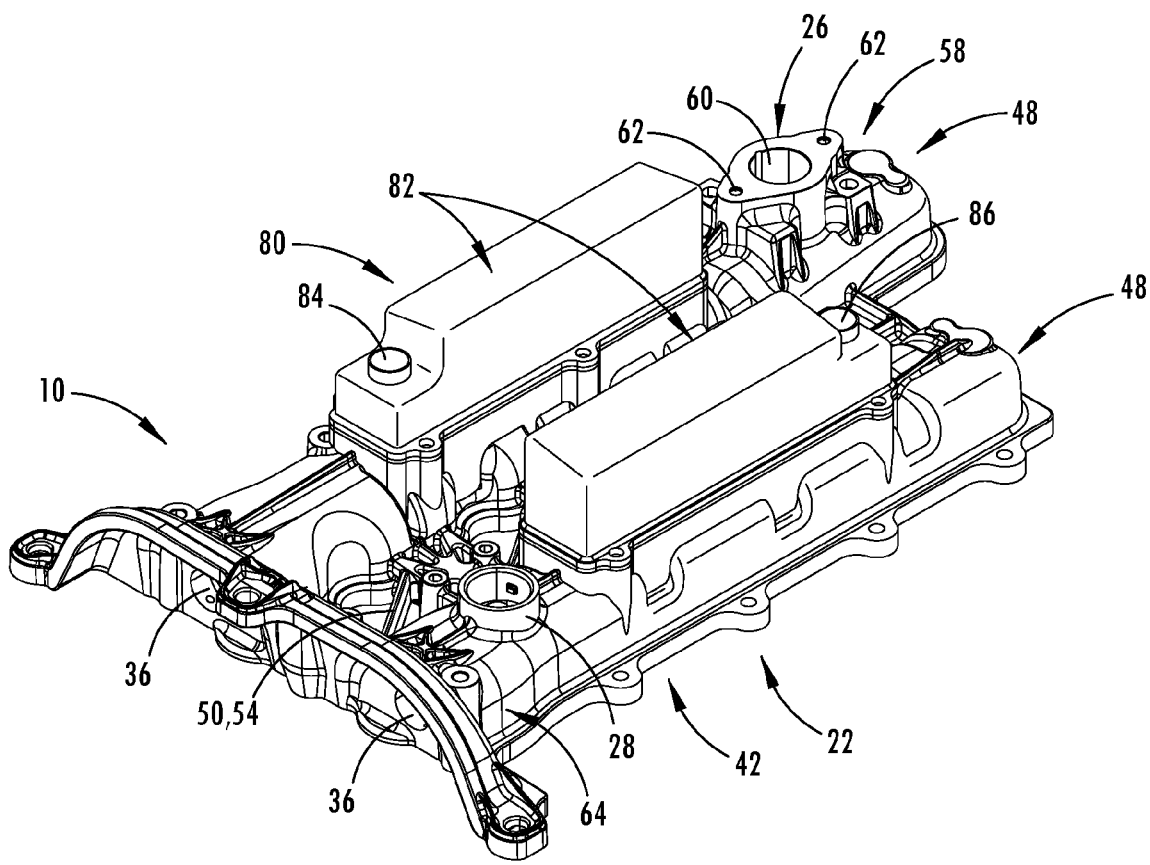
FIG. 13 is a top perspective view of the assembled PCV system on the additional embodiment of the unitary cover and carrier.

Referring now to FIGS. 12-13, an additional embodiment of the unitary cover and carrier 10 is shown with a positive crankcase ventilation (PCV) system 80. As generally understood, the PCV system 80 removes vapors from the pressurized crankcase (i.e. the interior volume of the unitary cover and carrier 10), which can be returned to the intake manifold of the engine to be burned in the combustion process. More specifically, the vapors contain unburned fuel and the byproducts of engine combustion, which may leak past sealing rings of the valves on the cylinder head 12 and into the cavities 32 of the unitary cover and carrier 10. This leakage, also referred to as blow-by gases, can be removed with the PCV system before the vapors condense and combine with the oil in the unitary cover and carrier 10. To do so, the illustrated embodiment of the PCV system 80 uses separator assemblies 82 attached to the unitary cover and carrier 10 to draw air through the unitary cover and carrier 10 and remove the vapors. In the depicted embodiment, one separator assembly 82 includes an outlet valve 84 that is configured to be lifted or otherwise opened by the engine vacuum and thereby create a low pressure area under the outlet valve 84 that draws vapors away from the cylinder head 12 and out of the unitary cover and carrier 10. The other separator assembly 82 in the illustrated embodiment includes an air inlet 86 that draws in air that results in a reduction in pressure in the unitary cover and carrier 10 as well as a removal of the vapors. The separator assemblies 82 in additional embodiments may have various geometric configurations and additional components, such as filters and air channels, to assist with removing blow-by gases.

As also shown in FIGS. 12-13, the exterior surface 24 of the illustrated embodiment of the unitary cover and carrier 10 includes integrally formed upstanding mounting flanges 88 that define an enclosed area 90 having a rectangular shape on each of the longitudinal cam housings 48 for each securing one of the separator assemblies 82. The upstanding mounting flanges 88 each incorporate a series of mounting apertures 92 proximate the corners thereof for receiving fasteners that secure the respective separator assembly 82 to the mounting flange 88 on the longitudinal cam housing 48. Also, the mounting flanges 88 are each formed to provide a consistent upper edge 94 that mates with the separator assembly 82 and forms a liquid and pressure tight seal there between. It is contemplated that a gasket or other material may be disposed there between to effectuate such a seal. Further, the mounting flanges 88 are integrally formed with the unitary cover and carrier 10 as a single unit, and thereby they are formed together with the same carbon fiber composite. However, as mentioned with reference to the previous illustrated embodiment, it is also contemplated that the mounting flanges may be integrally formed in other embodiments with varied properties of composite from the unitary cover and carrier 10. Also, it is conceivable that the mounting flanges in additional embodiments may have various geometric configurations to properly mate and form a seal with the respective separator assembly.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A valve cover module, comprising:
   a unitary cover and carrier made of a carbon fiber composite and having an interior side with a series of cavities interconnected with aligned apertures defining bearing surfaces and a peripheral edge for attaching to a cylinder head;
   a plurality of cam lobes disposed in the series of cavities; and
   a camshaft rotatable on the bearing surfaces and extending through the aligned apertures to couple with the plurality of cam lobes, wherein the bearing surfaces of the aligned apertures have strands of carbon fiber wound around in a direction of a circumference of the camshaft.

2. The valve cover module of claim 1, wherein at least one of the plurality of cam lobes includes a greater diameter than the aligned apertures.

3. The valve cover module of claim 1, wherein an exterior side of the unitary cover and carrier includes an integrally formed fuel pump pedestal for attaching a fuel pump.

4. The valve cover module of claim 3, wherein an oil fill port extends through the unitary cover and carrier between the exterior and interior sides, and wherein the exterior side of the unitary cover and carrier includes an integrally formed mounting flange for attaching a separator assembly of a PCV system.

5. The valve cover module of claim 3, wherein the exterior side of the unitary cover and carrier includes fuel rail mounting bosses integrally formed therewith.

6. The valve cover module of claim 1, wherein the bearing surfaces encompass a circumference of the aligned apertures and are made of the carbon fiber composite of the unitary cover and carrier.

7. The valve cover module of claim 1, wherein a gasket is attached around to the peripheral edge of the interior surface and is configured to sealably engage the cylinder head to cover valves of the cylinder head, such that the unitary cover and carrier encloses the camshaft.

8. The valve cover module of claim 7, wherein the interior side of the unitary cover and carrier includes at least two rows of the series of cavities and each of the at least two rows includes a separate camshaft.

9. A unitary cover and carrier for enclosing engine valves, comprising:
a cover portion having an exterior surface with an integrally formed fuel pump pedestal and an oil fill port; and
a carrier portion that includes a series of vertical walls having aligned apertures that define cam bearings, wherein the cover portion and the carrier portions are integrally formed together with carbon fiber composite as a single unit, and wherein the earn bearings have strands of carbon fiber wound around in a direction of a circumference of the cam bearings.

10. The unitary cover and carrier of claim 9, wherein the series of vertical walls separate a series of domed cavities that define an interior surface of the cover portion and carrier portion.

11. The unitary cover and carrier of claim 10, wherein the aligned apertures are configured to rotatably couple with a camshaft, and wherein the series of domed cavities are configured to house cam lobes of the camshaft.

12. The unitary cover and carrier of claim 10, wherein the oil fill port extends through the cover portion to interconnect with at least one of the series of domed cavities.

13. The unitary cover and carrier of claim 9, wherein the exterior surface of the cover portion includes a plurality of fuel rail mounting bosses and a mounting flange for a PCV system integrally formed therewith.

14. The unitary cover and carrier of claim 9, wherein the bearing surfaces encompass a circumference of the aligned apertures and are made of the single unit of carbon fiber composite.

15. The unitary cover and carrier of claim 14, wherein oil feed channels are formed integrally within the series of vertical walls and extend to the circumference of the aligned apertures for lubricating the cam bearings.

16. The unitary cover and carrier of claim 9, wherein a gasket is attached around to a lower peripheral edge of the carrier portion and is configured to sealably engage a cylinder head to cover the engine valves.

17. The unitary cover and carrier of claim 9, wherein the fuel pump pedestal is positioned on the cover portion proximate a first end and integrally formed with a first longitudinal cam housing.

18. The unitary cover and carrier of claim 17, wherein the oil fill port is positioned on the cover portion proximate a second end and integrally formed with a second longitudinal cam housing.

19. The unitary cover and carrier of claim 9, wherein the carbon fiber is made of wound filament.

20. A unitary cover and carrier for enclosing engine valves, comprising:
a cover portion; and
a carrier portion that includes a series of vertical walls having aligned apertures that define cam bearings, wherein the cover portion and carrier portion are integrally formed together with layered sheets of carbon fiber, and wherein the cam bearings have strands of carbon fiber wound around in a direction of a circumference of the cam bearings.

* * * * *

UNITED STATES PATENT AND TRADEMARK OFFICE
CERTIFICATE OF CORRECTION

| | | |
|---|---|---|
| PATENT NO. | : 9,810,176 B2 | Page 1 of 1 |
| APPLICATION NO. | : 14/576599 | |
| DATED | : November 7, 2017 | |
| INVENTOR(S) | : Wicks et al. | |

It is certified that error appears in the above-identified patent and that said Letters Patent is hereby corrected as shown below:

In the Claims

Column 9:
Claim 9, Line 33;
"portions are" should be --portion is--.
Claim 9, Line 35;
"earn" should be --cam--.

Signed and Sealed this
Twenty-third Day of January, 2018

Joseph Matal
*Performing the Functions and Duties of the
Under Secretary of Commerce for Intellectual Property and
Director of the United States Patent and Trademark Office*